Patented Dec. 1, 1942

2,303,828

UNITED STATES PATENT OFFICE 2,303,828

METHOD OF PREVENTING STICKING OF VINYL RESIN SHEETS

Elmer R. Derby, Springfield, Mass., assignor to Monsanto Chemical Company, St. Louis, Mo., a corporation of Delaware No Drawing. Application July 25, 1940, Serial No. 347,478

4 Claims. (Cl. 154—2)

The present invention has for its object the means of preventing the adhesion to each other of superposed layers of sticky, tacky, vinyl resins, such as for example polyvinyl acetal resin plastic or the like. The polyvinyl acetal resins such as are described in the patent to Morrison, Skirrow and Blaikie, Reissue No. 20,430, dated June 29, 1937, when plasticized with suitable plasticizers, for instance, dibutyl phthalate, triethylene glycol dihexoate, tributyl phosphate, diethyl phthalate and dibutyl sebacate, etc., in proportions suitable for safety glass interlayers, are extremely sticky and tacky. This material is conveniently referred to as polyvinyl acetal resin plastic and is used in the manufacture of laminated glass and is produced in the form of sheets or rolls for shipment to the manufacturer. Since in the manufacture of laminated glass it is essential that the gauge of the material shall be extremely accurate and be uniform throughout the entire surface of the sheet, and since pulling the sheet stretches it and produces variations in gauge which persist for a considerable length of time, and because if the sheets in a bundle or pack stick together or the successive layers in a roll adhere to each other, and because it is necessary to pull the sheet to separate them, the sticky, tacky character of the material is a matter of serious concern to the users of the material. Not only does the tacky surface greatly retard the manufacturing processes and thus increase the expense, but it results in loss from spoilage. Heretofore, attempts have been made to overcome this difficulty by applying to the surface a powder which will adhere to it and has to be removed by washing. It has been customary to dust the surface with powdered borax, bicarbonate of soda, or the like, as the material is manufactured and on arrival at the laminating plant to submit the sheets to a washing operation to dissolve off the powder. This involves not only the expense of the powder and the labor of applying the powder, but also that of washing it off and subsequently drying the sheet. Furthermore, the powder, such as borax and bicarbonate of soda, sometimes becomes embedded in the material so that particles of it may not be completely removed by washing. Such particles cause the serious defect known as haze in the finished article.

In accordance with this invention it has been found that while these polyvinyl acetal resin plastics are extremely tacky, sticky and adherent to themselves, and certain other substances, they adhere only slightly to cellulosic materials having a dense and substantially non-porous surface, such for example as cardboard having a glazed surface, waxed paper, cellulose acetate sheeting and regenerated cellulose sheeting and the like. Accordingly, I prepare thin sheets of these materials to form an interlayer to be placed between superposed layers of vinyl resins, for example polyvinyl acetal resin plastic.

The following examples are given as specific embodiments of this invention:

A pack is made of alternate sheets of a polyvinyl acetal resin plastic made from polyvinyl acetal resin made with formaldehyde and plasticized with a suitable amount of diethylene glycoldipropionate and sheets of regenerated cellulose about two-one thousandths of an inch in thickness.

A safety glass plastic of 100 parts by weight of a polyvinyl resin made with formaldehyde containing 82% acetal, 8% hydroxyl groups figured as polyvinyl alcohol and 10% acetate and known as Formvar and 60 parts by weight of diethylene glycol dipropionate is interleaved with non-moisture-proof Cellophane.

A safety glass plastic, .015" thick consisting of 100 parts by weight of a polyvinyl resin made with butyraldehyde containing from 0 to 2% acetate, 16 to 20% hydroxyl group figured as polyvinyl alcohol and the balance acetal and known as Butvar and 72 parts by weight of dibutyl phthalate, is interleaved with a cellulose acetate plastic .002" or .003" thick. The cellulose acetate plastic contains 100 parts by weight of cellulose acetate, 17½ parts by weight of triphenyl phosphate, 5 parts by weight of dimethyl phthalate and 15 parts by weight of diethyl phthalate.

A continuous safety glass plastic of 100 parts by weight of Butvar and 43 parts by weight of triethylene glycol dihexoate separated by a .003" cellulose acetate plastic, consisting of 100 parts by weight of cellulose acetate, 17½ parts by weight of triphenyl phosphate and 22 parts by weight of diethyl phthalate.

Sheets of safety glass plastic of 100 parts by weight of polyvinyl acetal resin plastic made from polyvinyl acetal resin made with formaldehyde and plasticized with 40 parts by weight of dibutyl phthalate and 40 parts by weight of dimethyl phthalate were separated from sticking by means of sheets of waxed paper.

Where cellulose acetate is employed, it is desirable not to have the proportion of plasticizer exceed the limits given in the above examples and thus to prevent exudation of plasticizer from the interlayer which may cause haze and other difficulties and may develop a tendency to increase the adhesion of the adjacent surfaces of the polyvinyl acetal plastic and the interlayer plastic.

Interleaf for safety glass purposes involves very special problems which are not present in standard interleaving for other materials, such as rubber. For example, if the interliner is too smooth the plastic may become so smooth that it will adhere prematurely to glass in assembly; and if the surface of the interliner shows a mottled effect, this may be transferred sufficiently to the plastic to be visible in the finished safety glass. A fine grained mat finish is preferred for my invention.

Sheets or films of other vinyl resins than the vinyl acetals, when possessing a sticky and tacky surface, may of course, be separated superficially and prevented from sticking to each other by the application of the principles of this invention. Thus, co-polymers of vinyl chloride and vinyl acetate are examples of other vinyl resins included within the scope of this invention.

The subject matter disclosed and claimed in this sole application is taken from the joint application Serial No. 228,444 as originally filed September 3, 1938, in the names of Elmer R. Derby and John M. De Bell.

What is claimed is:

1. In a method for producing laminated safety glass interlayers from polyvinyl acetal resin plastic sheets having extremely sticky and tacky surfaces, the improvement for preventing adhesion of sheets of said plastic to one another and for preventing premature adhesion of a surface of the interlayer to glass during the assembly of glass and interleaf for making the laminated glass which comprises interposing between the plastic sheets another sheet one side of which has a fine grain matte surface, said other sheet comprising a cellulosic plastic material.

2. A method as defined in claim 1 in which said other sheet comprises a cellulose acetate.

3. A method as defined in claim 1 in which said other sheet comprises regenerated cellulose.

4. In a method for producing laminated safety glass interlayers for vinyl resin plastic sheets, having extremely sticky and tacky surfaces, the improvement for preventing adhesion of sheets of said plastic to one another and for preventing premature adhesion of a surface of the interlayer to the glass during the assembly of glass and interleaf for making the laminated glass which comprises interposing between the plastic sheets another sheet one side of which has a fine grain matte surface, said other sheet comprising a cellulosic plastic material.

ELMER R. DERBY.